United States Patent Office 3,166,049
Patented Jan. 19, 1965

3,166,049
DEVICE FOR PREVENTING A SOW FROM LYING HER PORKLINGS TO DEATH
Liss Axel Lundin, Bjorkhult Gard, Hjorted Station, Sweden, assignor to Aktiebolaget Tillvaxtfaktorer, Hjorted Station, Sweden, a joint-stock company of Sweden
Filed June 11, 1962, Ser. No. 201,353
Claims priority, application Sweden, June 20, 1961, 6,438/61
9 Claims. (Cl. 119—96)

The present invention is related to a restraining device for preventing sows from lying their porklings to death.

The reason that sows so often lie their porklings to death is to be found in the way in which a sow normally lays herself down. The sow bends at first her forelegs and then her hindlegs so that she will lie on her belly, after which she rolls over to one side. At this procedure the porklings may easily get caught under the sow, when she rolls over on her side, so that they are squeezed to death. This is due to the fact that, when the sow has bent her forelegs, she will very easily lose her balance so that her hind quarters suddenly fall to one side, due to which a porkling which is in the way will not normally manage to get out of the way but will be caught under the sow. It is not unusual that in this way about 10% of the porklings are squeezed to death by the sow or are so seriously injured that they have to be put to death.

In order to protect the porklings against this the sow is normally during the farrowing shut up in a cage, which is so narrow that the sow cannot turn around or fall to one side, when she lays herself down. Such a cage must, however, be very strong and comparatively tight and will consequently be heavy, clumsy and expensive, in addition to which it will be rather difficult to keep the cage clean. Further the freedom of movement for the sow will be very limited, due to which it is not possible to shut up the sow in such a cage but for comparatively short periods of time.

The object of the present invention is to provide a simple, easy and cheap device, which effectively prevents the sow from lying her porklings to death, but which in spite of this permits the sow a comparatively large freedom of movement. The device according to the invention requires that the sow be tethered by means of a fastening around the neck and comprises two shafts extending on opposite sides of the sow, each of which is at its fore portion attached to a fixed point in such a way that the shaft is swingable only in a substantially vertical plane, whereas the rear end of the shaft rests freely against the floor. According to the invention the two shafts may preferably be connected with one another at their rear ends to form a U-shaped frame, which embraces the sow from the rear.

Figure 1:
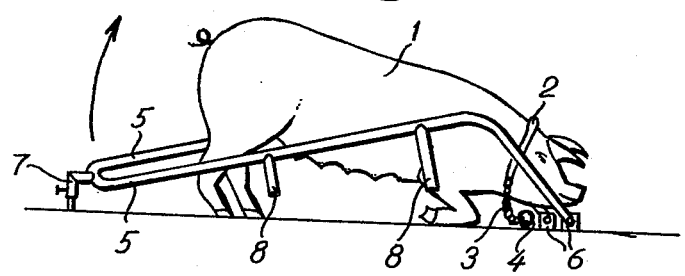
Figure 2:
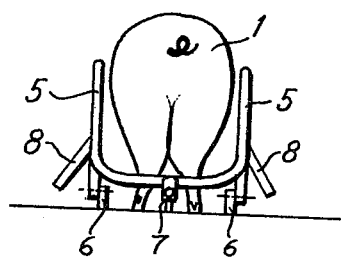
Figure 3:
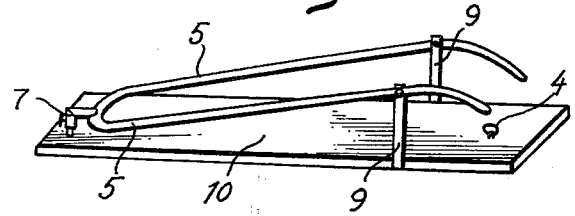

In the following the invention will be further described with reference to the accompanying drawing, in which FIG. 1 by way of example shows a side elevation of form of a device according to the invention, whereas FIG. 2 shows the same device seen from the rear. FIG. 3 shows in perspective another form of a device according to the invention.

FIGS. 1 and 2 in the drawing show a sow 1, which is tethered to a ring 4 in the floor by means of a collar 2 and a chain 3. The device according to the invention consists of two shafts 5 extending on opposite sides of the sow 1. The rear ends of the shafts are connected to one another to form a substantially U-shaped frame embracing the sow from the rear. The fore ends of the shafts are journalled in fastening pieces 6 attached to the floor, which provides a base, whereas the rear end of the frame rests freely on the floor by means of a supporting leg 7 so that the shafts can freely be pivoted about the fastening pieces 6 in a substantially vertical plane in the direction of the arrow. The head portion of the sow is substantially fixed in a predetermined position by means of the collar and the tether chain, whereas the hind portion of the sow has a certain freedom of movement. Due to the shafts 5 the sow cannot lay herself down if she has one or both of her hind legs outside one of the shafts, but she is forced to place herself with all her legs between the shafts, before she can lay herself down. When the sow lays herself down, she is supported on both sides by the shafts 5, so that there is no danger that she may lose her balance and let her hind quarters fall to the one side. When the sow has bent her fore legs as well as her hind legs and lies on her belly, she cannot roll over on her one side, but she must cautiously shift herself over to her one side, staying between the shafts. In this way the sow is effectively prevented from squeezing her porklings to death. As shown in FIGS. 1 and 2, the shafts are preferably arched or bow-shaped in the vertical plane in such a way that the highest point of the shafts lies substantially at the withers of the sow, due to which the sow cannot step outside the shafts with her fore legs. Due to the fact that the shafts are freely swingable in the vertical plane about the fastening pieces 6, there is no risk that the sow, when she is lying, will get stuck between the floor and the shafts, but she can without hindrance get up. Due to the fact that the frame formed by the shafts may be pivoted upwards it is also easy to keep clean under the sow and to reach the sow for attendance of her at the farrowing. In order to prevent the sow, when in a lying position, from crawling out too far under the shafts, these may according to the invention, as shown in FIGS. 1 and 2, be provided with projecting arms 8, which extend obliquely downwards and outwards from the sow and the outer ends of which lie on a certain distance from the floor. The supporting leg 7 is preferably of adjustable length so that the height of the shafts above the floor may be varied. For calm sows it is consequently possible to lower the rear ends of the shafts towards the floor so that the sow has comparatively large freedom of movement for her hind legs, whereas for nervous sows the shafts may be raised above the floor to such an extent that the sow is forced to maintain her hind legs between the shafts 5, as well as the front legs. When the porklings become larger it may also be advantageous to raise the rear ends of the shafts somewhat so that the shafts will clear the porklings when sucking.

It is of course not necessary that the rear ends of the shafts, as in the form of the invention shown in FIGS. 1 and 2, be connected to one another to form a U-shaped frame as long as the arrangement provides sufficient rigidity in the lateral direction.

The form of a device according to the invention shown in FIG. 3 differs from the device shown in FIGS. 1 and 2 substantially in that the shafts, instead of being fastened at their fore ends, are adjacent to their highest point swingably journalled in stationary posts 9. Further the entire device is mounted on a loose base plate 10, which will serve as a bed for the sow and on which also the tether ring 4 is mounted and eventually also a food trough and a water cup. The device will in this way constitute a complete, easily portable unit.

Instead of being swingably attached to fastening means provided in the floor or on a base plate, as described above, the shafts may of course also be swingably attached to support means attached to the walls of a box or similar on opposite sides of the sow, whereby it becomes easier to keep the floor under the sow clean.

I claim:

1. A restraining device for a sow comprising a base, collar type tethering means secured to said base, shaft means disposed on opposite sides of said tethering means and extending rearwardly therefrom, and means located at the front portion of said shaft means for pivotally mounting said shaft means on said base for movement in a vertical direction only, the rear end of said shaft means resting freely on said base, the front portion of said shaft means being elevated with respect to said base so as to embrace at the withers a sow which is standing between said shaft means with her head oriented toward the front of said shaft means and her rear end oriented toward the rear end of said shaft means, and the rear portion of said shaft means being lower than said front portion, but being spaced above said base so as to be opposite the rear legs of said sow and thus to provide freedom of lateral movement of the sow when standing, but restricting lateral movement as the sow lowers herself into a lying position.

2. A restraining device as claimed in claim 1 in which said base is a portable base plate.

3. A restraining device for a sow comprising a base, collar type tethering means secured to said base, shaft means in the form of a substantially rigid U-shaped member which includes a pair of parallel shafts and a rear connecting portion, the front ends of said shafts being disposed on opposite sides of said tethering means, laterally spaced pivot means providing a pivotal connection between the front portion of each shaft and said base, the lateral spacing of said pivot means cooperating with the U-shape of said shaft means to prevent horizontal movement of said shaft means, but permitting vertical swinging movement thereof to avoid binding action on the sow's hind legs when in a reclining position.

4. A restraining device as claimed in claim 3 in which the front portions of said shafts are bowed upwardly so that the highest points thereof are located substantially at the withers of a sow standing between said shafts, and including means for maintaining the rear end of said shaft means spaced above the floor.

5. A device as claimed in claim 4 in which said pivot means are connected to the front ends of said shafts.

6. A device as claimed in claim 4 in which said pivot means are in the form of columns connected to said highest points.

7. A restraining device as claimed in claim 3 which includes an adjustable supporting leg located at the rear of said U-shaped member.

8. A device as claimed in claim 3 in which said shaft means is provided with restraining members projecting substantially perpendicularly from said shafts and being oriented obliquely downwardly and outwardly therefrom.

9. A frame, for use in conjunction with tethering means, for preventing a sow from lying her porklings to death comprising a substantially rigid U-shaped member which includes a pair of parallel shafts and a rear connecting portion, the front intermediate portions of said shafts being bowed upwardly with respect to the floor so that the highest points thereof are located substantially at the withers of a sow standing between said shafts, pivot means providing a pivotal connection between the front end of each shaft and the floor, and means for maintaining the rear end of said U-shaped member spaced above the floor.

References Cited by the Examiner

UNITED STATES PATENTS

| 1,083,101 | 12/13 | Inabnit | 119—103 |
| 2,438,979 | 4/48 | Short | 119—101 |
| 2,536,268 | 1/51 | Dillon | 119—103 |
| 2,783,823 | 3/57 | Tong | 119—96 |
| 2,788,767 | 4/57 | Dooley | 119—103 |
| 2,980,060 | 4/61 | Marsh | 119—103 |
| 3,023,734 | 3/62 | Schaub | 119—103 |
| 3,063,418 | 11/62 | Hall | 119—20 |

FOREIGN PATENTS 201,318   4/56   Australia.

SAMUEL KOREN, *Primary Examiner*.
ALDRICH F. MEDBERY, *Examiner*.